INVENTOR.
Bobbie L. Edwards

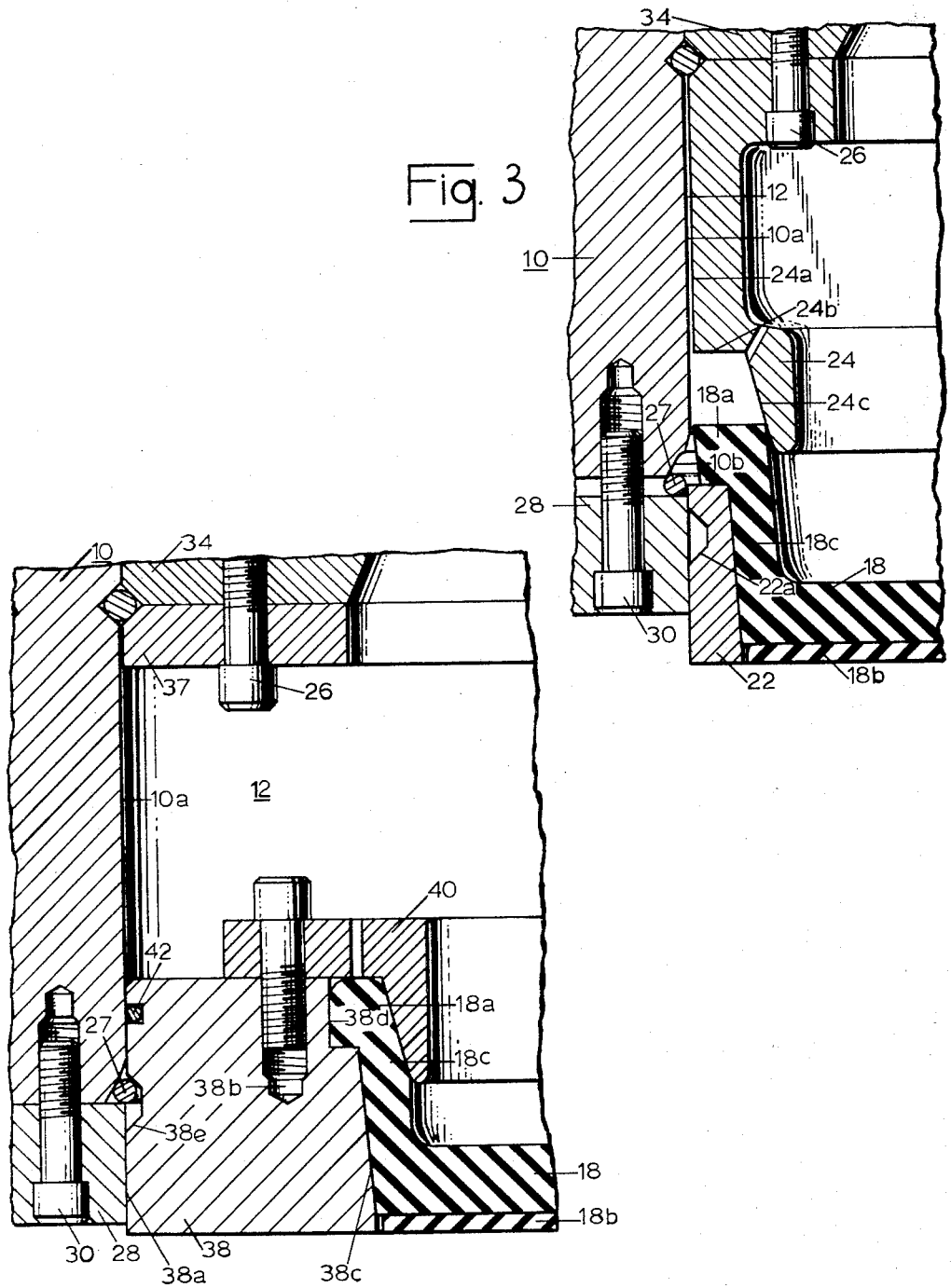

United States Patent Office

3,430,473
Patented Mar. 4, 1969

3,430,473
MOUNTING CONSTRUCTION FOR DIAPHRAGM IN FORMING PRESS
Bobbie L. Edwards, Cincinnati, Ohio, assignor to The Cincinnati Milling Machine Co., Cincinnati, Ohio, a corporation of Ohio
Filed Aug. 21, 1967, Ser. No. 662,008
U.S. Cl. 72—63         13 Claims
Int. Cl. B21d 22/10, 25/18

ABSTRACT OF THE DISCLOSURE

A diaphragm and mounting assembly for a fluid forming press. The lip of the diaphragm is sealed against the chamber wall by a tapered surface which forces it outward as the diaphragm cartridge is inserted. The cartridge is locked in by compressing a snap-ring into a groove formed in the sleeve.

---

This invention pertains to the field of fluid forming presses of the type using fluid pressure acting through a flexible diaphragm to form a blank around a male die. More specifically, this relates to a novel diaphragm and assembly for locking and sealing the diaphragm in the forming chamber.

The state of the diaphragm art in forming presses of this type prior to the present is exemplified by U.S. Patent 3,075,485.

This invention provides an external lip on the diaphragm which is forced outward by a tapered surface against the wall of the chamber. The lip is forced to seal against the wall of the chamber. The taper also forces the lip downward so that the diaphragm is practically self-ejecting. A novel means of locking the diaphragm in place is provided by compressing a snap-ring into a groove in a supporting sleeve.

It is difficult to mold rubber diaphragms to close tolerances. If the diaphragm is oversize, it is difficult to insert in the chamber. If it is undersize, it is difficult to seal. However, the apparatus of this invention forces the lip of the diaphragm outward to seal against the wall of the chamber. This high force means the diaphragm can be made undersize and still effectively seal. Also, the surface of the chamber on which the diaphragm seals need not be machined to a high surface finish.

Often parts smaller than the maximum allowable diameter are produced. Since the most expensive element in the operation of a fluid forming press of this type is the diaphragm, it is desirable to use a diaphragm the size of the blank. This invention provides a simple means to adapt the chamber to use an undersize diaphragm.

Another advantage to this invention is that, due to the tapered force acting on the lip of the diaphragm, the diaphragm tends to be self-ejecting. Hydraulic pressure is not needed to eject the diaphragm. Thus, there is no difficulty in removing a ruptured diaphragm.

Also, the diaphragm of the present invention requires a small amount of rubber to mold. The locking lip is external to the diaphragm which simplifies molding. Thus, the diaphragm is relatively cheap to mold.

In the drawings:
FIG. 1 is a cross sectional view of the diaphragm mounted in the head of the press along line 1—1 of FIG. 2, showing the position therein when the press is open.

FIG. 3 is a fragmentary cross sectional view on the same reference line as FIG. 1, showing the diaphragm cartridge in a partially inserted position.

FIG. 4 is a fragmentary cross sectional view of an undersized diaphragm in the inserted position.

Figure 2:
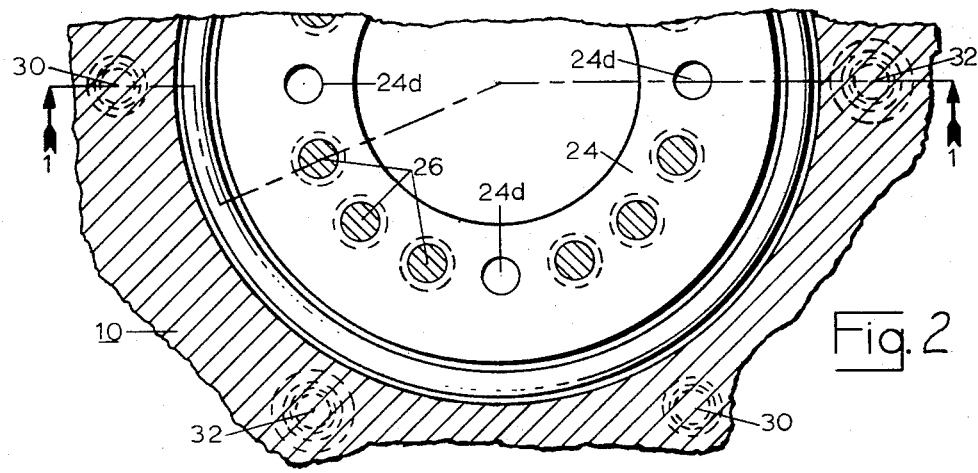
FIG. 2 is a cross sectional view along line 2—2 of FIG. 1.
Figure 1:
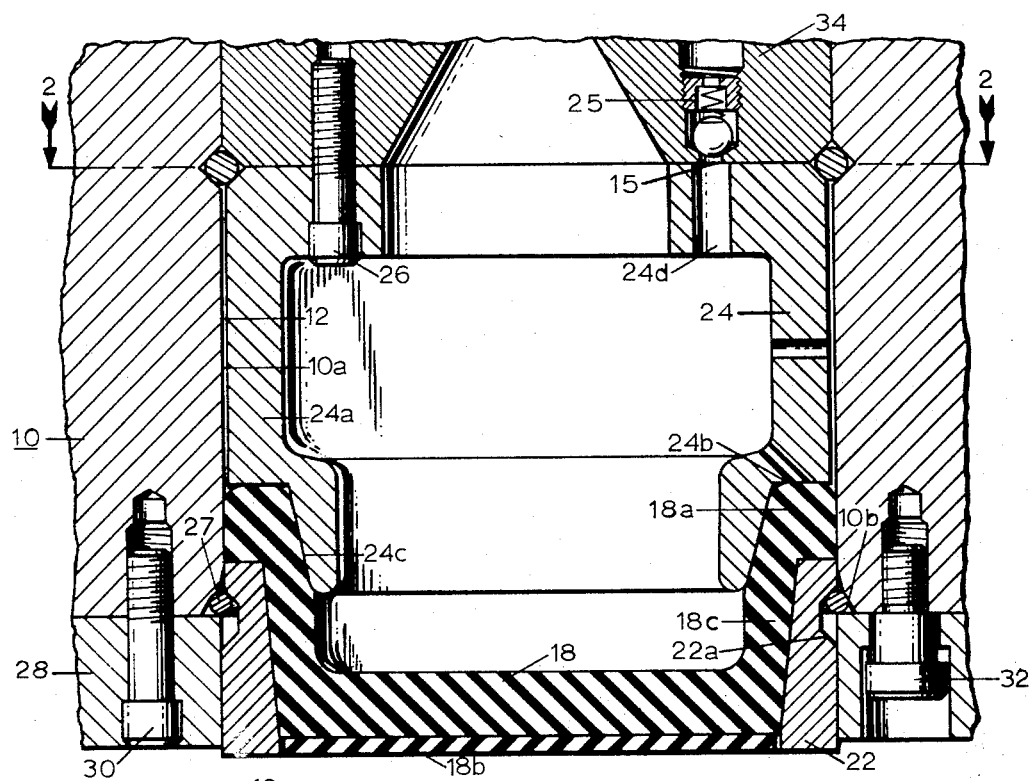
Figure 1:
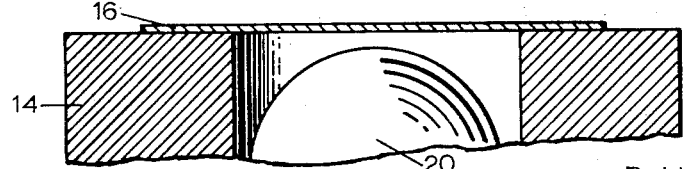

The diaphragm and mounting structure of the present invention is particularly suited for use in a forming press of the type shown in U.S. Patent 2,766,711 and U.S. Patent 2,878,767. In the illustrative embodiment of the invention shown in FIGS. 1, 2 and 3 and described herein, the press has a head 10, with a fluid pressure chamber 12 therein, the lower portion of the fluid pressure chamber forms a cylindrical wall 10a with a circular opening at its lower end. The machine has an annular nest 14 to support a workpiece 16. The head 10 and bed member 14 are relatively movable so that they can be separated far enough for removal of a formed workpiece and for insertion of a workpiece blank 16. The pressure chamber 10 has a number of openings 15 to receive hydraulic fluid which is retained therein by a diaphragm 18. When the press is closed, the diaphragm 18 engages the workpiece blank 16 on the bed member 14. During forming the hydraulic fluid in the pressure chamber is subjected to a high pressure and a male die, or punch 20, is raised from within the bed member 14. The high pressure fluid in the chamber behind the diaphragm acts through the flexible diaphragm 18 to press the blank 16 against the raised punch to form the workpiece to the shape of the punch. After forming, the pressure in the chamber is relieved, and the press is opened to remove the finished workpiece.

There is provided in the present invention a sleeve 22 which is received around the diaphragm 18 and against an annular lip 18a of the diaphragm. The diaphragm has a tapered wall 18c for ease of insertion into the sleeve 22. The diaphragm includes a wear pad 18b. A locating member 24 is mounted in the pressure chamber 12 by a plurality of bolts 26. The locating member 24 has a wall 24a extending downwardly within the chamber. At the end of the wall 24a is an annular shoulder 24b and a tapered surface 24c. By inserting the sleeve 22, which is made of rigid material such as steel, onto the diaphragm and this assembly into the chamber 12, the lip 18a of the diaphragm 18 is compressed into sealed relationship with the wall 10a by the taper 24c, the shoulder 24b and the sleeve 22. The sleeve 22 is locked in position by a snap-ring 27 which tends toward an outward position. To allow clearance for insertion, the ring 27 is compressed into the groove 22a of the sleeve 22 by a clamp 28 which is clamped by a plurality of cap screws 30 spaced around the clamp 28. A number of shoulder screws 32 are also spaced around the clamp 28 to provide a control for the distance the clamp is released.

To insert a diaphragm in the press the bed member 14 and head 10 are separated and the sleeve 22, with the diaphragm held within, is placed on the bed member 14. The press is then closed and the cap screws 30 are tightened. This, in turn, raises the clamp 28 and the camming surface 10b on the wall 10a of the head 10 compresses the ring 27 and locks the sleeve in place.

To remove a diaphragm from the press, the press is first closed. The cap screws are then loosened until the clamp rests on the shoulder screws. The press is then opened slowly. Since the taper 24b of the ring 24 tends to force the lip 18a downward as well as outward, the diaphragm and sleeve are easily removed with little, if any, oil pressure required.

With this construction, the diaphragm flange is restrained very little by the taper 24b. Thus, any tendency of the diaphragm flange to creep within the sleeve as a result of a deep draw is not significantly impeded by the locating member 24, and as a result the possibility of diaphragm rupture is lessened. The lip 18a is continuously urged outward to continuously maintain the fluid seal whether the press is open or closed. Due to this relatively high compression of the lip 18a, the surface finish of the wall 10a need not be high to effect a good seal as was required by prior devices. Also, the slope of the flange 18c makes this an ideal diaphragm for molding. It is also an advantage that less rubber is required to make a diaphragm of this type than is required in known prior art devices.

The locating member 24 has four holes 24d which align with the valves 25 of the partition 34, this partition being shown in detail in U.S. Patent 3,262,294.

FIG. 4 shows the ease of adapting a press to use a smaller diaphragm within the teaching of this invention. This involves removing the locating member 24 of FIG. 1 and installing a plate 37 shown in detail in U.S. Patent 3,262,294. The machine is now adapted to receive a smaller diaphragm. The diaphragm 18 is preassembled in an adapting sleeve 38 having an annular groove 38a in its outside diameter. The adapting sleeve 38 also has a plurality of threaded holes 38b and a tapered inside diameter 38c for engagement with the flange 18c of the diaphgram 18. A shoulder 38d is formed on the top of the inside diameter 38c for engagement with the lip 18a. An adapted locating member 40 is mounted on the ring 38 to spread the lip 18a outward into sealed relationship with the sleeve 38. The sleeve 38 has an annular groove 38e in the outside diameter with a flexible O-ring 42 received therein which, with the sleeve 38, provides a seal that prevents the escape of fluid between the wall 10a of the pressure chamber and the ring 38. The diaphragm 18, spreader ring 40, and the adapting sleeve 38 can be preassembled, and inserted and withdrawn from the press with ease.

What is claimed is:
1. In a forming press having a fluid pressure chamber bounded by an annular wall closed at one end by a flexible diaphragm die, a diaphragm cartridge and mounting assembly comprising:
  (a) a locating member adapted for mounting in the chamber, said member having an inclined annular surface spaced from the chamber wall and extending therearound to form a tapered space therebetween, said tapered space opening toward the one end of the chamber;
  (b) a flexible diaphragm having an upstanding flange ending in a radially outward extending lip, said lip being slidably received within the annular wall;
  (c) a rigid sleeve received around the upstanding flange and against the lip of said diaphragm, said sleeve adapted to slide into the chamber to an inserted position wherein the lip of said diaphragm is compressed in the tapered space to form a fluid tight seal; and
  (d) means releasably operable for retaining said sleeve at the inserted position in said chamber.

2. An assembly as claimed in claim 1, wherein said means for retaining comprises:
  (a) an annular camming surface formed on the wall at the one end of the chamber;
  (b) a rigid ring mounted on the one end of the chamber, said ring having an inside diameter corresponding to that of the wall of the chamber and in axial alignment therewith;
  (c) an annular groove formed in the outside diameter of said sleeve;
  (d) a split torus biased toward an open position, said torus held between said rigid ring and said camming surface such that when said rigid ring is clamped against the end of the chamber, said torus is forced radially inward to a position wherein said torus extends partially into said annular groove to lock said sleeve in place in the chamber; and
  (e) means releasably operable for clamping said rigid ring against the one end of said chamber, said means for clamping, when released, permitting said rigid ring to move to a position allowing said torus to move radially outward along said camming surface to a position clear of said sleeve.

3. An assembly as claimed in claim 2, wherein said means for clamping comprises:
  (a) a plurality of shoulder screws extending loosely through said rigid ring and fixed to the one end of the chamber, the shoulders of said screws determining the released position of said rigid ring; and
  (b) a plurality of cap screws attached through said rigid ring to the one end of said chamber for clamping said rigid ring.

4. An assembly as claimed in claim 1, wherein the inside wall of said sleeve is tapered slightly in a radial direction to aid in insertion of said diaphragm.

5. An assembly as claimed in claim 1, wherein said locating member further comprises an annular shoulder therearound extending between said inclined annular surface and the wall of the chamber, said shoulder further limiting the tapered space.

6. In a forming press having a fluid pressure chamber bounded by an annular wall closed at one end by a flexible diaphragm die, a diaphragm cartridge and mounting assembly comprising:
  (a) a flexible diaphragm having an upstanding flange ending in a radially outward extending lip;
  (b) a rigid sleeve received around the upstanding flange and against the lip of said diaphragm, said sleeve adapted to slide into the chamber to an inserted position;
  (c) a locating member having an inclined annular surface, said annular surface adapted to be received within the upstanding flange of said diaphragm to a position such that the lip of said diaphragm is forced radially outward;
  (d) means releasably operable for retaining said sleeve at the inserted position in said chamber; and
  (e) means releasably operable for retaining said annular surface at said position within the flange of said diaphragm.

7. In a forming press having a fluid pressure chamber bounded by an annular wall closed at one end by a flexible diaphragm die, a diaphragm cartridge and mounting assembly for adapting the chamber for use with an undersize die, the assembly comprising:
  (a) a flexible diaphragm having an upstanding flange ending in a radially outward extending lip;
  (b) a sleeve adapted to slide into the chamber to an inserted position, said sleeve having an enlarged diameter at one end to form an annular step therein, said sleeve received around the upstanding flange of said diaphragm to a position such that the lip of said diaphragm bears on said annular step;
  (c) a locating member adapted for mounting on the one end of said sleeve, said member having an inclined annular surface to extend into said sleeve to a position around and spaced from the enlarged diameter of said sleeve to form a tapered space therebetween such that when said member is mounted on said sleeve, the lip of said diaphragm is compressed in said tapered space to form a fluid tight seal;
  (d) means releasably operable for retaining said sleeve at the inserted position in said chamber;
  (e) means for sealing said sleeve against the wall of said chamber; and
  (f) means for releasably mounting said locating member on said sleeve.

8. An assembly as claimed in claim 7, wherein said means for retaining comprises:
  (a) an annular camming surface formed on the wall at the one end of the chamber;
  (b) a rigid ring releasably mounted on the one end of the chamber, said ring having an inside diameter corresponding to the of the wall of the diaphragm;
  (c) an annular groove formed in the outside diameter of said sleeve;
  (d) a split torus of resilient material being biased toward an open position, said torus held between said rigid ring and said camming surface such that when said rigid ring is clamped against the one end of the chamber, said torus is forced radially inward to a position wherein said torus extends partially into said annular groove to lock said sleeve in place in the chamber; and
  (e) means releasably operable for clamping said rigid ring against the one end of the chamber, said means for clamping, when released, permitting said rigid ring to move to a position allowing said torus to move radially outward along said camming surface to a position clear of said sleeve.

9. An assembly as claimed in claim 8, wherein said means for clamping comprises:
  (a) a plurality of shoulder screws extending loosely through said rigid ring and fixed to the one end of the chamber, the shoulders of said screws determining the released position of said rigid ring; and
  (b) a plurality of cap screws attached through said rigid ring to the one end of said chamber of clamping said rigid ring.

10. An assembly as claimed in claim 7, wherein the inside wall of said sleeve is tapered slightly in a radial direction to aid in insertion of said diaphragm.

11. In a forming press having a fluid pressure chamber bounded by an annular wall closed at one end by a flexible diaphragm die, the diaphragm having an upstanding flange ending in a radially outward extending lip, an apparatus for retaining the diaphragm in the chamber, the apparatus comprising:
  (a) a rigid sleeve received around the upstanding flange and against the lip of the diaphragm, said sleeve having an annular groove in its outside diameter, said sleeve adapted to slide into the chamber to an inserted position;
  (b) an annular camming surface formed on the wall at the one end of the chamber;
  (c) a rigid ring mounted on the one end of the chamber, said ring having an inside diameter corresponding to that of the wall of the chamber and in axial alignment therewith;
  (d) a split torus of resilient material biased toward an open position, said torus held between said rigid ring and said camming surface such that when said rigid ring is clamped against the end of the chamber, said torus is forced radially inward to a position wherein said torus extends partially into said annular groove to lock said sleeve in the inserted position in the chamber; and
  (e) means releasably operable for clamping said rigid ring against the one end of the chamber, said means for clamping, when released, permitting said rigid ring to move to a position allowing said torus to move radially outward along said camming surface to a position clear of said sleeve.

12. In a forming press having a fluid pressure chamber bounded by an annular wall closed at one end by a flexible diaphragm die, a diaphragm cartridge and mounting assembly comprising:
  (a) a locating member adapted for mounting in the chamber, said member having:
    (1) an inclined annular surface spaced from the chamber wall and extending therearound to form a tapered space therebetween, said tapered space opening toward the one end of the chamber, and
    (2) an annular shoulder therearound extending between said inclined annular surface and the wall of the chamber further limiting the tapered space;
  (b) a flexible diaphragm having an upstanding flange inclined slightly outward, said flange ending in a radially outward extending lip, said lip being slidably received within the wall;
  (c) a rigid sleeve received around the upstanding flange and against the lip of said diahragm, said sleeve having an annular groove formed in the outside diameter, the inside wall of said sleeve being tapered slightly in a radial direction to aid in insertion of said diaphragm, said sleeve adapted to slide into the chamber to an inserted position wherein said diaphragm lip is compressed in the tapered space into fluid sealing relationship with the wall of said chamber;
  (d) an annular camming surface formed on the wall at the one end of the chamber;
  (e) a rigid ring mounted on the one end of the chamber, said ring having an inside diameter corresponding to that of the wall of the chamber and in axial alignment therewith;
  (f) a split torus of resilient material being biased toward an open position, said torus held between said rigid ring and said camming surface such that when said rigid ring is clamped against the one end of the chamber, said torus is forced radially inward to a position wherein said torus extends partially into the annular groove in said sleeve to lock said sleeve in place in the chamber; and
  (g) means releasably operable for clamping said rigid ring against the one end of said chamber, said means for clamping, when released, permitting said rigid ring to move to a position allowing said torus to move radially outward along said camming surface to a position clear of said sleeve.

13. In a forming press having a fluid pressure chamber bounded by an annular wall closed at one end by a flexible diaphragm die, a diaphragm cartridge and mounting assembly for adapting the chamber for use with an undersize die, the assembly comprising:
  (a) a flexible diaphragm having an upstanding flange inclined slightly outward ending in a radially outward extending lip;
  (b) a sleeve adapted to slide into the chamber to an inserted position, said sleeve having an annular groove formed in the outside diameter and an enlarged diameter at one end to form an annular step therein, said sleeve received around the upstanding flange of said diaphragm to a position such that the lip of said diaphragm bears on said annular step, the inside wall of said sleeve being tapered slightly in a radial direction to aid in insertion of said diaphragm;
  (c) a locating member releasably mounted on the one end of said sleeve, said member having an inclined annular surface extending into said sleeve to a position around and spaced from the enlarged diameter of said sleeve to form a tapered space therebetween wherein the lip of said diaphragm is compressed to form a fluid tight seal;

(d) an annular camming surface formed on the wall of the chamber at the one end of the chamber;

(e) a rigid ring releasably mounted on the one end of the chamber, said ring having an inside diameter corresponding to that of the wall of the chamber and in axial alignment therewith;

(f) a split torus of resilient material biased toward an open position, said torus held between said rigid ring and said camming surface such that when said rigid ring is clamped against the one end of the chamber, said torus is forced radially inward to a position wherein said torus extends partially into the annular groove in said sleeve to lock said sleeve in place in the chamber; and (g) means releasably operable for clamping said rigid ring against the one end of said chamber, said means for clamping, when released, permitting said rigid ring to move to a position allowing said torus to move radially outward along said camming surface to a position clear of said sleeve.

References Cited

UNITED STATES PATENTS

| | | | |
|---|---|---|---|
| 2,878,767 | 3/1959 | Paulton | 72—63 |
| 3,075,485 | 1/1963 | Mitchell | 72—63 |
| 3,120,205 | 2/1964 | Pfeiffer et al. | 72—63 |

RICHARD J. HERBST, *Primary Examiner.*